(12) United States Patent
Kim et al.

(10) Patent No.: US 7,859,496 B2
(45) Date of Patent: Dec. 28, 2010

(54) LIQUID CRYSTAL DISPLAY DEVICE

(75) Inventors: Byoung Cho Kim, Taegu-kwangyokshi (KR); Kyoung Hun Lee, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 1557 days.

(21) Appl. No.: 10/980,201

(22) Filed: Nov. 3, 2004

(65) Prior Publication Data

US 2005/0253836 A1    Nov. 17, 2005

(30) Foreign Application Priority Data

Dec. 4, 2003    (KR)    ...................... 10-2003-0087559

(51) Int. Cl.
*G09G 3/36*    (2006.01)

(52) U.S. Cl. ........................ 345/87; 345/100

(58) Field of Classification Search ................... 345/58, 345/87–100, 204–215, 690–699
See application file for complete search history.

(56) References Cited

U.S. PATENT DOCUMENTS

| | | | | |
|---|---|---|---|---|
| 5,243,272 A | * | 9/1993 | Hall et al. ................... | 324/73.1 |
| 5,283,477 A | * | 2/1994 | Shibata ........................ | 327/306 |
| 5,798,740 A | * | 8/1998 | Bitzakidis et al. ............. | 345/92 |
| 5,818,402 A | * | 10/1998 | Park et al. ...................... | 345/58 |
| 5,841,411 A | * | 11/1998 | Francis ........................ | 345/58 |
| 7,154,332 B2 | * | 12/2006 | Tsuchi ........................ | 330/255 |

FOREIGN PATENT DOCUMENTS

JP    13-147420    5/2001

OTHER PUBLICATIONS

Office Action for corresponding Korean Patent Application Serial No. 10-2003-0087559, dated Nov. 2, 2007.

* cited by examiner

*Primary Examiner*—Vijay Shankar
(74) *Attorney, Agent, or Firm*—Brinks Hofer Gilson & Lione

(57) ABSTRACT

A liquid crystal display (LCD) device is provided which includes an LCD panel having first and second substrates facing each other, a plurality of gate and data lines crossing each other to define a plurality of pixel regions; a common electrode; a coupling line perpendicular to the data lines, to generate a signal by a coupling phenomenon with the data lines; and a common voltage generation circuit and a common voltage compensation circuit receiving the signal from the coupling line for compensating the common voltage. The compensated common voltage is applied to the common electrode.

12 Claims, 4 Drawing Sheets common voltage

LIQUID CRYSTAL DISPLAY DEVICE

This application claims the benefit of the Korean Application No. P2003-87559 filed on Dec. 4, 2003, which is hereby incorporated by reference.

FIELD

The present application relates to a liquid crystal display (LCD) device, and, more particularly, to preventing distortion of a common voltage in an LCD device.

BACKGROUND

Many efforts have been made in research and development of various flat display devices such as liquid crystal display (LCD), plasma display panel (PDP), electroluminescent display (ELD), and vacuum fluorescent display (VFD), and some species of the flat display devices are already applied to displays of various equipment types.

Amongst the various flat display devices, the liquid crystal display (LCD) device has been widely used due to advantageous characteristics of thin profile, light weight, and low power consumption, when the LCD device is substituted for a Cathode Ray Tube (CRT). In addition to the mobile-type LCD devices such as a display for a notebook computer, LCD devices have been developed for computer monitors and for television, to display broadcasting signals.

Despite various technical developments in the LCD technology with applications in different fields, research in enhancing the picture quality of the LCD device has been in some respects lacking as compared to other features and advantages of the LCD device. In order to use the LCD device in various fields as a general display, it is desirable for the LCD device to have a high quality picture, such as high resolution and high luminance with a large-sized screen while still maintaining the light weight, thin profile, and low power consumption characteristics.

An LCD device includes an LCD panel for displaying a picture image, and a driver for applying a driving signal to the LCD panel. Also, the LCD panel includes first and second substrates bonded to each other at predetermined intervals, and a liquid crystal layer between the first and second substrates. The first substrate (TFT array substrate) is comprised of a plurality of gate lines arranged in one direction at fixed intervals, a plurality of data lines arranged at fixed intervals perpendicular to the plurality of gate lines, a plurality of pixel electrodes arranged in a matrix in the pixel regions defined by the plurality of gate and data lines crossing each other, and a plurality of thin film transistors being switched according to signals of the gate lines for transmitting signals of the data lines to the respective pixel electrodes.

A related art LCD device will be described with reference to the accompanying drawings. An equivalent circuit diagram of one pixel in a related art LCD device is shown in FIG. 1. The circuit includes a thin film transistor T, a liquid crystal capacitance $C_{LC}$, and a storage capacitor $C_{st}$. The thin-film transistor T has a source electrode and a gate electrode connected with a data line D and a gate line G, respectively, formed on a first substrate. A liquid crystal capacitance $C_{LC}$ is formed between a pixel electrode and a common electrode C, the pixel electrode connected with a drain electrode of the thin-film transistor T, and the common electrode C formed on an upper substrate. The storage capacitor $C_{st}$ is formed between the pixel electrode connected with the drain electrode of the thin-film transistor T and the adjacent gate line or an additional storage line.

When a gate signal is applied to the gate line G, the thin-film transistor T is turned on, so that a gray level voltage, set according to a data signal from the data line D, is applied to each frame of the pixel. An electric field, corresponding to a difference between the gray level voltage applied to the pixel and a common voltage applied to the common electrode C, is applied to a liquid crystal layer, thereby controlling light transmittance on the basis of intensity of the electric field. The storage capacitor $C_{st}$ maintains the gray level voltage applied to the pixel during one picture frame time interval, thereby displaying an image for one frame interval, as defined by the data.

If an electric field of a fixed direction is continuously applied to the liquid crystal layer, the liquid crystal layer deteriorates. To prevent such deterioration of the liquid crystal layer, the gray level voltage applied from the data line D is provided alternately with a positive (+) polarity or a negative (−) polarity with respect to the common voltage of the common electrode C. That is, when applying the gray level voltage to one pixel, a gray level voltage of positive polarity with respect to the common voltage is applied to the first frame, and a gray level voltage of negative polarity with respect to the common voltage is applied to the second frame, such that gray level voltages of the positive polarity and the negative polarity are applied to each pixel during alternate frame intervals. This driving method is referred to as an inversion driving method.

An effective value of the voltage applied to the liquid crystal layer is determined as the voltage corresponding to the difference between the gray level voltage applied to the pixel electrode and the common voltage applied to the common electrode C. When driving the LCD device by the inversion driving method, the common voltage should be maintained at a constant level so that the gray level voltage of positive polarity and the gray level voltage of negative polarity are symmetric with respect to the common voltage, and the gray level voltages of positive and negative polarity applied to the pixel have the same absolute value.

As shown in FIG. 1, a parasitic capacitance $C_{cd}$ is generated at a crossing portion of the common electrode C transmitting the common voltage and the data line D transmitting the gray level voltage, thereby generating a coupling phenomenon. As a result, the common voltage is distorted due to the gray level voltage.

FIG. 2 is a waveform diagram of the undistorted common voltage. FIG. 3 is a waveform diagram showing distortion of the common voltage by the gray level voltage of positive polarity and the gray level voltage of negative polarity.

As shown in FIG. 2, the common voltage is a voltage having a constant D.C. level. By the coupling phenomenon, as shown in FIG. 3, the common voltage is distorted to a signal having an A.C. level having rising ripple and falling ripple corresponding to the gray level voltage of positive polarity and negative polarity. A parasitic capacitance $C_{gd}$ is present at the crossing portion of the data line D and the gate line G, thereby generating the coupling phenomenon. As a result, the gate signal transmitted from the gate line G is synchronized with the distortion of the common voltage, whereby the gate signal is distorted by the rising ripple and falling ripple according to the gray level voltage of positive polarity and the gray level voltage of negative polarity. To prevent the distortion of common voltage, a method for compensating the distortion of common voltage by using the distorted common voltage and an inverted common voltage having a phase of 180° has been studied and researched.

A related art common voltage generation circuit will be described with reference to the accompanying drawings. FIG.

4 is a schematic view of a related art common voltage generation circuit. FIG. 5 is a waveform diagram of a compensated common voltage.

As shown in FIG. 4, the related art common voltage generation circuit 31 is provided with a common voltage generator 31a, and a common voltage compensator 31b. The common voltage generator 31a generates the common voltage, and the common voltage compensator 31b receives the common voltage outputted from the common voltage generator 31a, and outputs a compensated common voltage.

The common voltage generator 31a is connected in series between a reference voltage $V_{DD}$ and a ground terminal, wherein the common voltage generator 31a is formed of resistances R1, R2 and R3, including a variable resistor to divide the reference voltage. The common voltage compensator 31b is comprised of a differential amplifier A, a capacitor C1 and a resistance R4 connected in series to an inverting terminal (−) of the differential amplifier A. The common voltage which is output from the common voltage generator 31a is input to an non-inverting terminal (+) of the differential amplifier A. A resistance R6 is connected ins series with an output terminal of the differential amplifier A and a resistance R5 connects the output terminal with the inverting terminal (−).

The gate signal output from a gate signal generator (not shown) is applied to the gate line G, the gate signal comprising a gate high signal $V_{gh}$ and a gate low signal $V_{gl}$. The gate low signal $V_{gl}$ of the D.C. level is inputted to the inverting terminal (−) of the differential amplifier A through the capacitor C1 and the resistance R4. At this time, the gate low signal $V_{gl}$ inputted to the inverting terminal (−) acts as a sensing signal to sense the distortion of the common voltage, when the common voltage is applied to the common electrode C.

That is, the gate signal applied to the gate line G is distorted by the waveform of the gray level voltage of the data line D due to the coupling phenomenon generated by the parasitic capacitance $C_{gd}$ formed between the data line D and the gate line G. The gate low signal $V_{gl}$ is changed to the distortion signal of the A.C. level having the repetitive rising ripple and falling ripple by the waveform of the gray level voltage.

An operation of the common voltage generation circuit 31 according to the related art will be described as follows. The reference voltage is divided by controlling the variable resistor, thereby outputting the common voltage. The gate low signal $V_{gl}$ outputted from the gate signal generator is inputted to the inverting terminal (−) of the differential amplifier A through the capacitor C1 and the resistance R4. The gate low signal $V_{gl}$ is not distorted, so that the gate low signal $V_{gl}$ is maintained at the D.C. level. As a result, the gate low signal $V_{gl}$ is not transmitted through the capacitor C1 connected in series to the inverting terminal (−) of the differential amplifier A. Thus, the differential amplifier A applies the common voltage inputted from the common voltage generator 31a to the common electrode C.

When the gate low signal $V_{gl}$ has an A.C. level due to the distortion of the gate low signal $V_{gl}$ generated by the coupling phenomenon, the gate low signal $V_{gl}$ passes through the capacitor C1 and the resistance R4 connected to the inverting terminal (−) of the differential amplifier A. The differential amplifier A amplifies the difference between the common voltage of the D.C. level inputted to the non-inverting terminal (+) and the gate low signal inputted to the inverting terminal (−). As a result, as shown in FIG. 5, the gate low signal $V_{gl}$ and the compensated common voltage having a phase difference of 180° are outputted through the output terminal. The amplification of the compensated common voltage is determined by the value of the resistance R4 connected to the inverting terminal (−) of the differential amplifier A and the resistance R5 connected between the inverting terminal (−) and the output terminal. The compensated common voltage is applied to the common electrode C. The A.C. component (ripple) of the compensated common voltage is offset by the coupled gray level voltage signal having the opposite phase to the compensated common voltage. As a result, the compensated common voltage has a constant D.C. level.

However, the related art common voltage generation circuit has the following disadvantages. The gate low signal is used to sense whether the common voltage is distorted by the coupling phenomenon or not. The gate low signal has noise since the gate low signal is provided to generate the gate signal. Accordingly, the gate low signal has the ripple generated by noise as well as the ripple generated by the coupling phenomenon. If the noise is amplified in the differential amplifier, the common voltage inputted to the differential amplifier is distorted in an undesired direction by the noise.

SUMMARY

A liquid crystal display (LCD) device having a stabilized common voltage is described.

A liquid crystal display (LCD) device includes an LCD panel having a plurality of gate and data lines crossing each other to define a plurality of pixel regions; a common electrode for receiving a common voltage; a coupling line perpendicular to the data lines on which a coupled signal is generated by a coupling phenomenon with the data lines; and a common voltage generation circuit receiving the coupled signal for compensating changes in said common voltage, which are created by a coupling phenomenon between the common electrode and that data lines. An insulating layer is formed between the data lines and the coupling line.

The common voltage generation circuit includes a common voltage generator outputting the common voltage, and a common voltage compensator receiving the common voltage outputted from the common voltage generator and the coupled signal generated by the coupling phenomenon, and outputting the common voltage with the changes compensated. The common voltage generator is comprised a reference voltage, a ground terminal, and a plurality of resistances, including a variable resistance connected between the reference voltage and the ground terminal in series, to divide the reference voltage and to output the common voltage.

The common voltage compensator is comprised of a differential amplifier including a non-inverting terminal to which the generated common voltage is inputted, an inverting terminal to which the coupled signal generated by the coupling phenomenon is inputted, and an output terminal from which the common voltage with the changes compensated is outputted.

Furthermore, the LCD device includes a resistance connected in series between the inverting terminal and the coupling line, a resistance connected between the inverting terminal and the output terminal of the differential amplifier and a resistance connected in series with the output terminal of the differential amplifier.

It is to be understood that both the foregoing general description and the following detailed description are exemplary and explanatory and are intended to provide further explanation of the invention as claimed.

DETAILED DESCRIPTION

Figure 1:
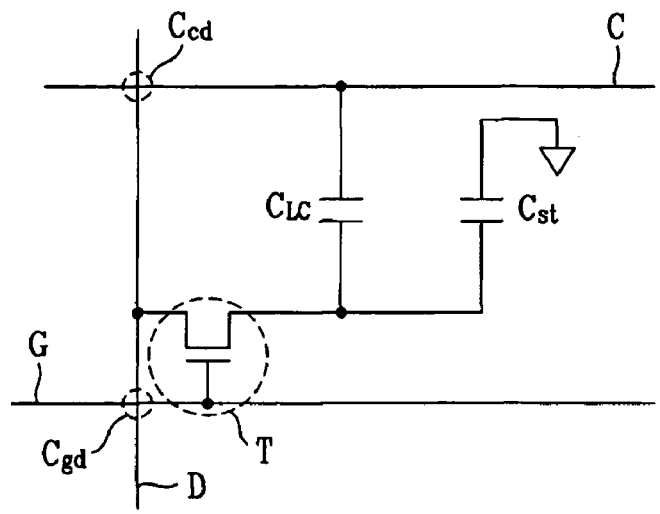
FIG. 1 is an equivalent circuit diagram of one pixel in a related art LCD device.
Figure 2:
FIG. 2 is a waveform diagram of a normal common voltage.
Figure 3:
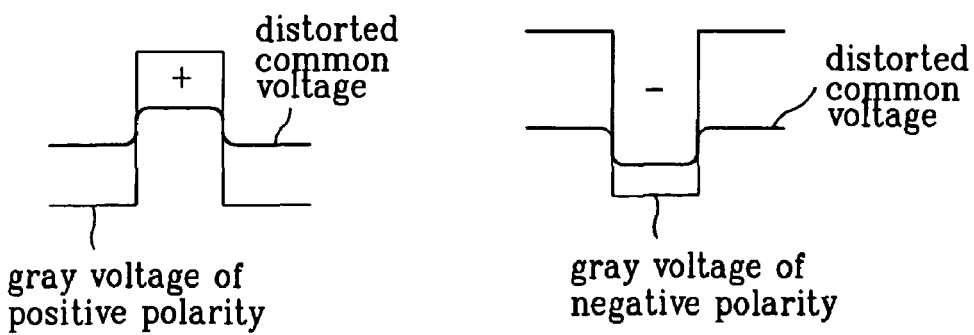
FIG. 3 is a waveform diagram showing distortion of a common voltage by a gray level voltage of positive polarity and a gray level voltage of negative polarity.
Figure 4:
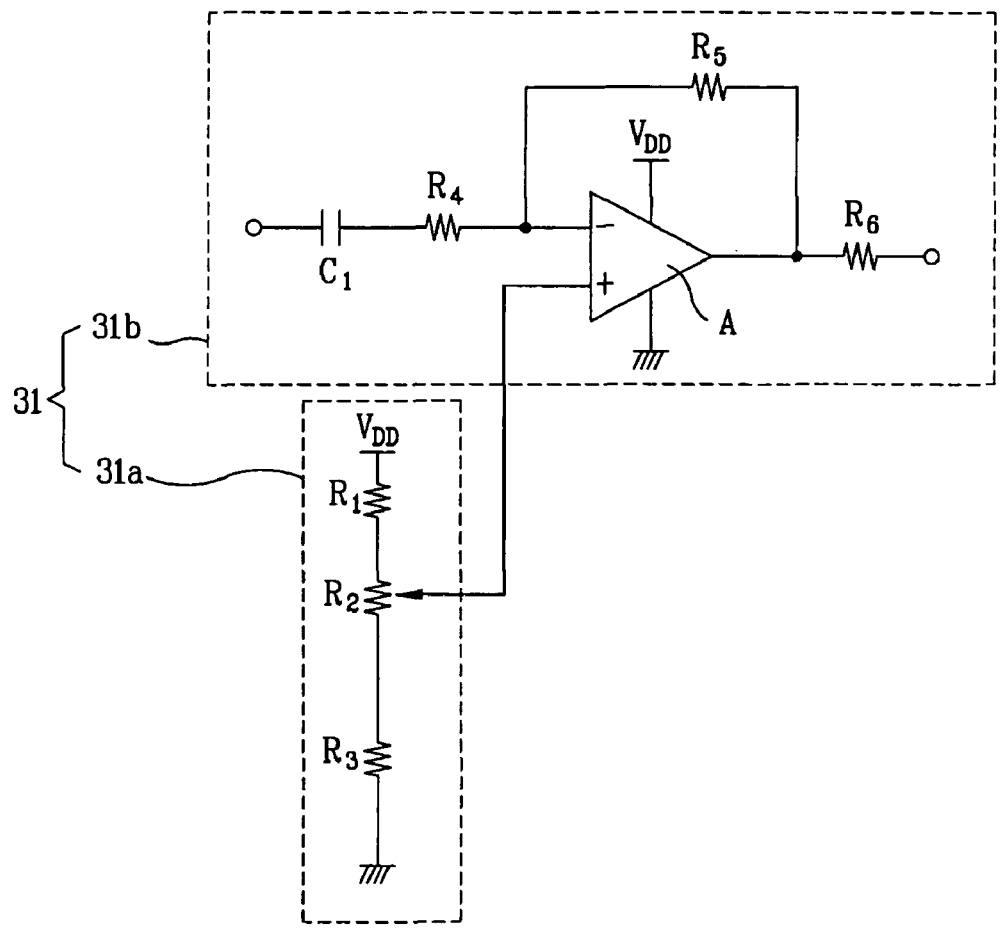
FIG. 4 is a schematic view of a related art common voltage generation circuit.
Figure 5:
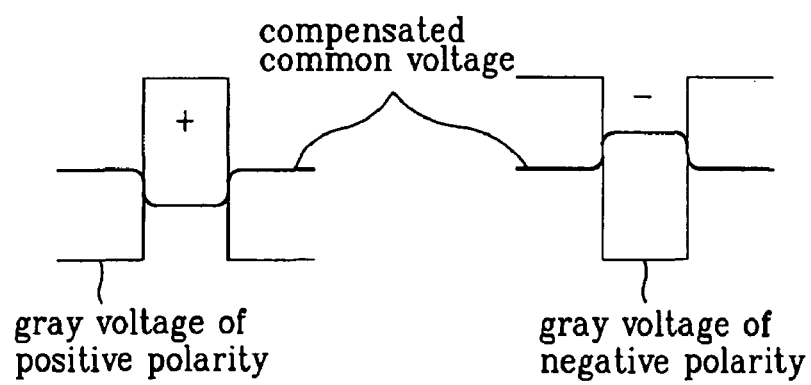
FIG. 5 is a waveform diagram of a compensated common voltage.

Other features of the present apparatus will appear in the following description of an embodiment given by way of a non-limiting example, with reference to the drawings, in which the same elements or parts throughout the figures of the drawings are designated by the same reference characters.

Figure 6:
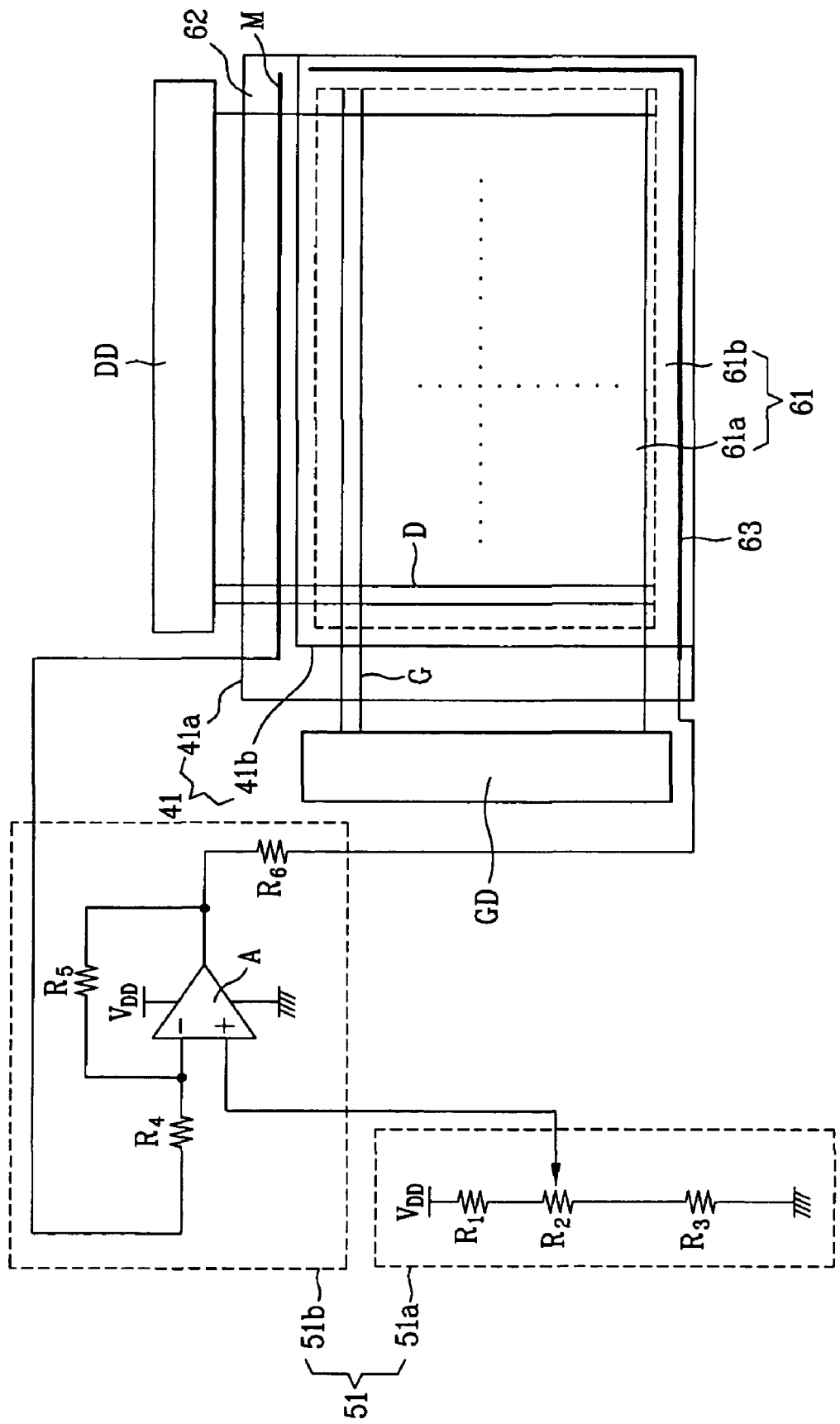
FIG. 6 is a schematic view of an LCD device according to an embodiment of the present invention.

As shown in FIG. 6, the LCD device includes an LCD panel 41, a gate driver GD and a data driver DD, and a common voltage generation circuit 51. The LCD panel 41 includes a first substrate 41a and a second substrate 41b, wherein the first substrate 41a has a common electrode line 63 and a coupling line M (the generating and outputting a feedback signal voltage), and the second substrate 41b has a common electrode (not shown) connected to the common electrode line 63 through an AG dots. The coupling line M may be a metal or other material having conductive properties. The first and second substrates 41a and 41b facing each other are bonded to each other. Also, the gate driver GD and the data driver DD provide driving signals to the LCD panel 41. The common voltage generation circuit 51 receives the feedback signal voltage from the coupling line M of the LCD panel 41, outputs a compensated common voltage, and provides the compensated common voltage to the common electrode of the second substrate 41b through the common electrode line 63 of the first substrate 41a.

The LCD panel 41 may be divided into a display area 61 on which a data image is displayed, and a non-display area 62 or pad region on which the data image is not displayed. The display area 61 includes an active region 61a and a liquid crystal margin region 61b. In the active region 61a, a plurality of gate G and data D lines crossing each other (as exemplified by lines G and D in FIG. 6) are formed to define a plurality of pixel regions, and a plurality of thin-film transistors (not shown) are formed at crossing points of the gate G and data D lines in the pixel regions. The liquid crystal margin region 61b is formed in on the periphery of the active region 61a. Although not shown, a liquid crystal layer is formed between the first and second substrates 41a and 41b.

Also, the liquid crystal margin region 61b provides the margin for liquid crystal injected into an interval between the two substrates 41a and 41b, so that the liquid crystal margin region 61b having a predetermined space is provided in the circumference of the active region 61a. The gate driver GD provides gate signals to the plurality of gate lines G formed on the LCD panel 41, and the data driver DD provides gray level voltages according to data signals to the plurality of data lines D formed on the LCD panel 41. The common electrode line 63 is provided on some of boundaries between the liquid crystal margin region 61b of the first substrate 41a and the non-display area 62. Also, the common electrode line 63 of the first substrate 41a is electrically connected with the common electrode of the second substrate 41b by Ag dots (not shown). The compensated common voltage outputted from the common voltage generation circuit 51 is applied to the common electrode line 63 of the first substrate 41a, and the compensated common voltage applied to the common electrode line 63 is applied to the common electrode of the second substrate 41b by the Ag dots.

Figure 7:
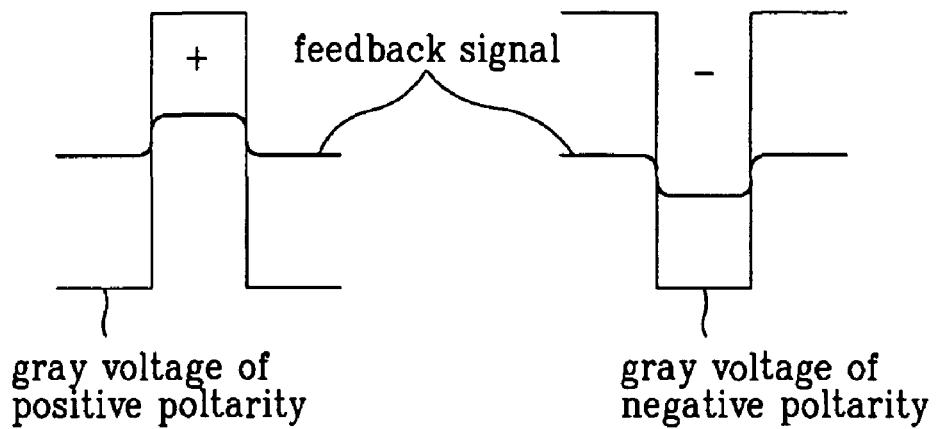
FIG. 7 is a waveform diagram of a feedback signal generated by a coupling phenomenon between a data line and a coupled line.

The coupling line M is formed on the non-display area 62 of the first substrate 41a, to overlap some of the data lines D formed on the non-display area 62. An insulating layer (not shown) is interposed between the coupling line M and the data line D, so that no signal is applied to the coupling line M in state where a voltage is not applied to the data line D. If the coupling line M is formed of material of the gate line, the insulating layer is formed on an entire surface of the first substrate including the gate line and the coupling line M. However, as the gray level voltage outputted from the data driver DD flows in the data line D, a parasitic capacitance may be generated between the data line D and the coupling line M. As a result, the coupling phenomenon is generated between the data line D and the coupling line M. As a result of the coupling phenomenon, a feedback signal distorted by the gray level voltage applied to the data line D may be generated in the coupling line M. That is, the gray level voltage of positive (+) polarity and the gray level voltage of negative (−) polarity are alternately applied to the data line D. As shown in FIG. 7, the feedback signal generated in the coupling line M has the repetitive rising ripple and falling ripple of the gray level voltage of positive (+) polarity and the gray level voltage of negative (−) polarity. The feedback signal generated from the coupling line M is applied to the common voltage generation circuit 51.

The role of the feedback signal generated from the coupling line M in the common voltage generation circuit 51 will be described. As shown in FIG. 6, the common voltage generation circuit 51 is provided with a common voltage generator 51a generating a common voltage, and a common voltage compensator 51b receiving and compensating the common voltage generated from the common voltage generator 51a. The common voltage generator 51a is connected between a reference voltage $V_{DD}$ and a ground terminal in series, wherein the common voltage generator 51a is comprised of a plurality of resistances R1, R2 and R3, including a variable resistor (or potentiometer), to divide the reference voltage.

The common voltage compensator 51b is comprised of a differential amplifier A, and a resistance R4 connected in series between an inverting terminal (−) of the differential amplifier A and the coupling line M. Then, the common voltage outputted from the common voltage generator 51a is inputted to a non-inverting terminal (+) of the differential amplifier A, and a resistance R6 is connected in series between an output terminal of the differential amplifier A and the common electrode line 63. In addition, a resistance R5 is connected between the inverting terminal (−) and output terminal of the differential amplifier A.

In this state, the feedback signal outputted from the coupling line M is inputted to the inverting terminal (−) of the differential amplifier A through the resistance R4. Then, the feedback signal inputted to the inverting terminal (−) acts as a sensing signal to sense whether the common voltage applied to the common electrode is distorted or not, when the common voltage is applied to the common electrode through the common electrode line 63. As described above, the common electrode is overlapped with the data line D. Thus, as the gray level voltage flows in the data line D, the coupling phenomenon is generated by the parasitic capacitance formed between the common electrode and the data line D. By the coupling phenomenon, the common voltage flowing in the common electrode is distorted in such that it may have a repetitive rising ripple and falling ripple associated with the gray level voltage of positive polarity and the gray level voltage of negative polarity. That is, the common voltage is output from the common voltage generator 51a with a constant level, but the common voltage is distorted to have the A.C. level by the gray level voltage of the data line D.

The distorted common voltage and the feedback signal of the coupling line M are generated in synchronism with the gray level voltage of the data line D. That is, the gray level voltage is applied to the data line D simultaneously passing through the upper side of the common electrode and the lower side of the coupling line M, whereby the coupling phenomenon is generated between the common electrode and the data line D, and between the coupling line M and the data line D. Thus, the common voltage outputted from the common electrode is distorted, and the feedback signal is generated in the coupling line M and inputted to the common voltage compensator 51b of the common voltage generation circuit 51. Accordingly, it is possible to determine that the common voltage is in the normal state or the distorted state by sensing the generation of the feedback signal in the coupling line M.

As described above, the feedback signal generated by the gray level voltage of the data line D flows in the coupling line M, but no gate line signal G is applied to the coupling line M. Thus, in the case of the feedback signal flowing in the coupling line M, there is no noise from another signal. No capacitor is required to block a D.C. level between the coupling line M and the inverting terminal (−) of the differential amplifier A.

The reference voltage is divided in the variable resistor of the common voltage generator 51a, thereby outputting the common voltage having a constant D.C. level and is inputted to the non-inverting terminal (+) of the differential amplifier A.

The differential amplifier A outputs the common voltage inputted to the non-inverting terminal (+) to the output terminal, and then the outputted common voltage is applied to the common electrode of the second substrate 41b through the common electrode line 63 of the first substrate 41a and the Ag dots. The coupling phenomenon between the data line D and the coupling line M, produces a feedback signal having the same phase as the gray level voltage of the data line D. The feedback signal generated in the coupling line M is inputted to the inverting terminal (−) of the differential amplifier A.

The coupling phenomenon also occurs between the data line D and the common electrode, and the common voltage applied to the common electrode is distorted to have the same ripple as the gray level voltage of the data line D.

Figure 8:
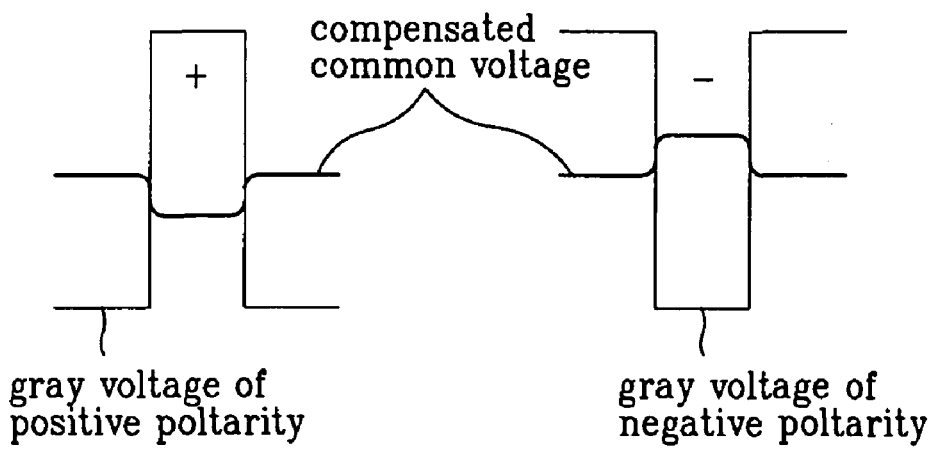
FIG. 8 is a waveform diagram of a common voltage compensated by a feedback signal.

As shown in FIG. 8, the differential amplifier A amplifies the difference between the common voltage inputted to the non-inverting terminal (+) and the feedback signal inputted to the inverting terminal (−), whereby the feedback signal and the compensated common voltage having a phase difference of 180° are outputted through the output terminal. The amplification of the compensated common voltage is determined by the value of the resistance R4 connected to the inverting terminal (−) and the resistance R5 connected between the inverting terminal (−) and the output terminal of the differential amplifier. The compensated common voltage is applied to the common electrode of the second substrate 41b by the common electrode line 63 of the first substrate 41a and the Ag dots. The A.C. component (ripple) of the compensated common voltage is thus offset and removed by the gray level signal having the opposite phase to the compensated common voltage. The resultant compensated common voltage has a constant D.C. level, and is thus stabilized.

In the LCD device described herein, the coupling line is formed to sense the coupling phenomenon generated between the common electrode and the data line, whereby it is possible to prevent the distortion of common electrode voltage generated by the coupling phenomenon. A coupling line is provided for sensing the coupling phenomenon. That is, no signal is coupled to the coupling line M in the state that the gray level voltage is not applied to the data line D. However, when the coupling phenomenon is generated by the gray level voltage from the data line formed below the coupling line, a feedback signal in the coupling having ripple of the same phase as the gray level voltage is generated. As a result, the feedback signal generated by the coupling phenomenon does not have undesired ripple generated by noise from signals other than the gray level voltage.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device comprising:
an LCD panel having a plurality of gate and data lines crossing each other and a common electrode;
a coupling line disposed in the LCD panel to overlap the data lines, on which a feedback signal is generated by a coupling phenomenon between the data lines and the coupling line; and
a common voltage generation circuit receiving the feedback signal from the coupling line and outputting a compensated common voltage to the common electrode.

2. The LCD device of claim 1, further comprising, an insulating layer formed between the data lines and the coupling line.

3. The LCD device of claim 1 wherein the common voltage generation circuit includes a common voltage generator outputting the common voltage, and a common voltage compensator that receives the common voltage outputted from the common voltage generator and the feedback signal from the coupling line, and outputs the compensated common voltage to the common electrode.

4. The LCD device of claim 3, wherein the common voltage generator comprises a reference voltage supply for supplying a reference voltage, a ground terminal, and a plurality of resistances including a variable resistor connected in series between the reference voltage supply and the ground terminal to divide the reference voltage and to output a common voltage.

5. The LCD device of claim 3, wherein the common voltage compensator comprises a differential amplifier, including a non-inverting terminal to which the common voltage is inputted, an inverting terminal to which the feedback signal IS inputted, and an output terminal from which the compensated common voltage is outputted to the common electrode.

6. The LCD device of claim 5, wherein the common voltage compensator further comprises a first resistance connected in series between the inverting terminal and the coupling line.

7. The LCD device of claim 6, wherein the common voltage compensator further comprises a second resistance connected between the inverting terminal and the output terminal of the differential amplifier.

8. The LCD device of claim 7, wherein the common voltage compensator further comprises a third resistance connected in series with the output terminal of the differential amplifier.

9. The LCD device of claim 1, wherein the coupling line is a metal line.

10. The LCD device of claim 4, wherein the variable resistor is a potentiometer.

11. A method of compensating a common voltage of a LCD display including an LCD panel having a plurality of gate and data lines crossing each other and a common electrode and a coupling line disposed in the LCD panel to overlap the data lines, the method comprising:

generating a feedback signal from the coupling line by a coupling phenomenon between a plurality of data lines and the coupling line;

generating a common voltage;

compensating the common voltage using the feedback signal from the coupling line; and applying the compensated common voltage to a common electrode.

12. A LCD display comprising:

an LCD assembly having a plurality of gate and data lines and a common electrode;

means for generating a feedback signal by a coupling phenomenon between the data lines and the means for generating a feedback signal;

means for generating a common voltage;

means for compensating the common voltage with the feedback signal; and means for applying the compensated common voltage to the common electrode.

\* \* \* \* \*